US011109017B2

(12) United States Patent
Feekes

(10) Patent No.: US 11,109,017 B2
(45) Date of Patent: Aug. 31, 2021

(54) SYSTEMS AND METHODS FOR FAULT DETECTION IN IMAGE SENSOR PROCESSORS

(71) Applicant: SEMICONDUCTOR COMPONENTS INDUSTRIES, LLC, Phoenix, AZ (US)

(72) Inventor: Dannie Gerrit Feekes, Corvallis, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 239 days.

(21) Appl. No.: 16/128,708

(22) Filed: Sep. 12, 2018

(65) Prior Publication Data

US 2020/0084437 A1     Mar. 12, 2020

(51) Int. Cl.

| G06F 11/30 | (2006.01) |
|---|---|
| H04N 17/00 | (2006.01) |
| H04N 5/05 | (2006.01) |
| H04N 5/232 | (2006.01) |
| H04N 5/225 | (2006.01) |
| G06T 1/20 | (2006.01) |

(52) U.S. Cl.
CPC .............. *H04N 17/002* (2013.01); *H04N 5/05* (2013.01); *H04N 5/2258* (2013.01); *H04N 5/23245* (2013.01); *G06T 1/20* (2013.01); *G06T 2210/52* (2013.01)

(58) Field of Classification Search
CPC .............................. G06F 11/2205; G06F 11/27

USPC ........................................................ 714/25, 30
See application file for complete search history.

(56) References Cited

U.S. PATENT DOCUMENTS

| 6,263,452 | B1 | 7/2001 | Jewett et al. |
|---|---|---|---|
| 6,633,335 | B1 * | 10/2003 | Kwon ............ G01R 31/318502 |
| | | | 341/120 |
| 6,708,285 | B2 | 3/2004 | Oldfield et al. |
| 2005/0114846 | A1 | 5/2005 | Banks et al. |
| 2007/0138375 | A1 * | 6/2007 | Lee ......................... H04N 5/374 |
| | | | 250/214 R |
| 2008/0158363 | A1 * | 7/2008 | Myers .................... H04N 5/335 |
| | | | 348/187 |
| 2014/0226027 | A1 * | 8/2014 | Johansson ............ H04N 17/002 |
| | | | 348/187 |

(Continued)

*Primary Examiner* — Chae M Ko
(74) *Attorney, Agent, or Firm* — Treyz Law Group, P.C.; Tianyi He

(57) ABSTRACT

An imaging system may include two or more pipeline processing circuits that receive image data streams from two or more corresponding image sensors and process the received image data in parallel in an image signal processing mode of operation. The imaging system may include fault detection circuitry coupled to the two or more pipeline processing circuits. The fault detection circuitry may configure the two or more pipeline processing circuits with fault detection configuration states and generate injection data for processing by the two or more pipeline processing circuits in a fault detection mode of operation. Fault detection may be enabled dynamically based on a horizontal and vertical sync circuit and during an image processing pause period between image frames. The imaging system having the fault detection circuitry may be configured to efficiently perform fault detection without interrupting image signal processing.

19 Claims, 6 Drawing Sheets

(56) References Cited

U.S. PATENT DOCUMENTS

2016/0117210 A1     4/2016  Reichenbach et al.
2016/0366402 A1*  12/2016  Myers ................. H04N 17/002
2018/0332276 A1*  11/2018  Hayashi ................ H04N 5/378

* cited by examiner

SYSTEMS AND METHODS FOR FAULT DETECTION IN IMAGE SENSOR PROCESSORS

BACKGROUND

This relates generally to imaging systems, and more particularly, to imaging systems having fault detection capabilities.

Image sensors are commonly used in electronic devices such as cellular telephones, cameras, and computers to capture images. In a typical arrangement, an image sensor is provided with an array of image pixels arranged in pixel rows and pixel columns. Circuitry is commonly coupled to each pixel column for reading out image signals from the image sensor. The image signals may be processed by image processing circuitry.

In applications that require high image fidelity, specialized error correction circuitry and dedicated redundancy circuitry can be provided in an imaging system. However, the cost of providing these types of circuitry is undesirable and can be cost prohibitive.

It would therefore be desirable to be able to provide imaging devices with improved fault detection functionalities.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
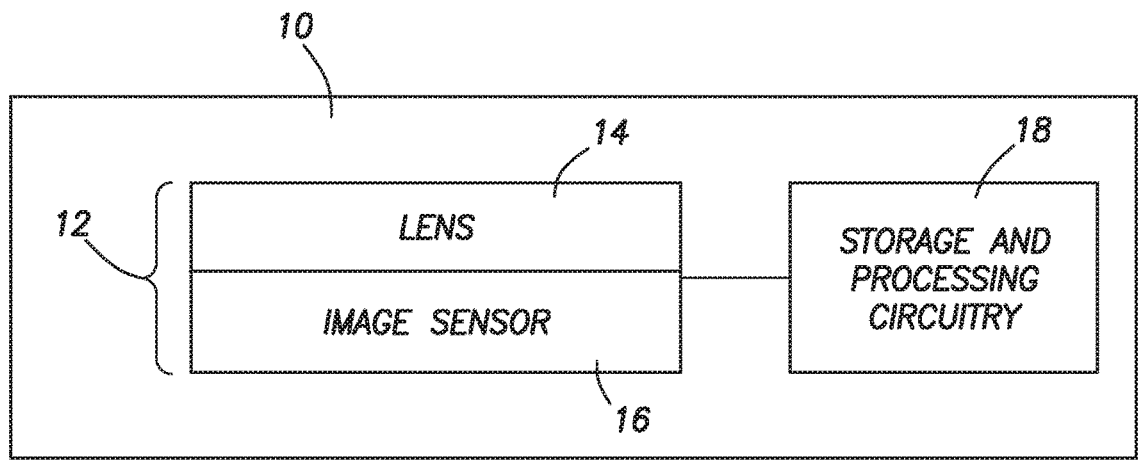
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 (sometimes referred to herein as an imaging system) of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel signals into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
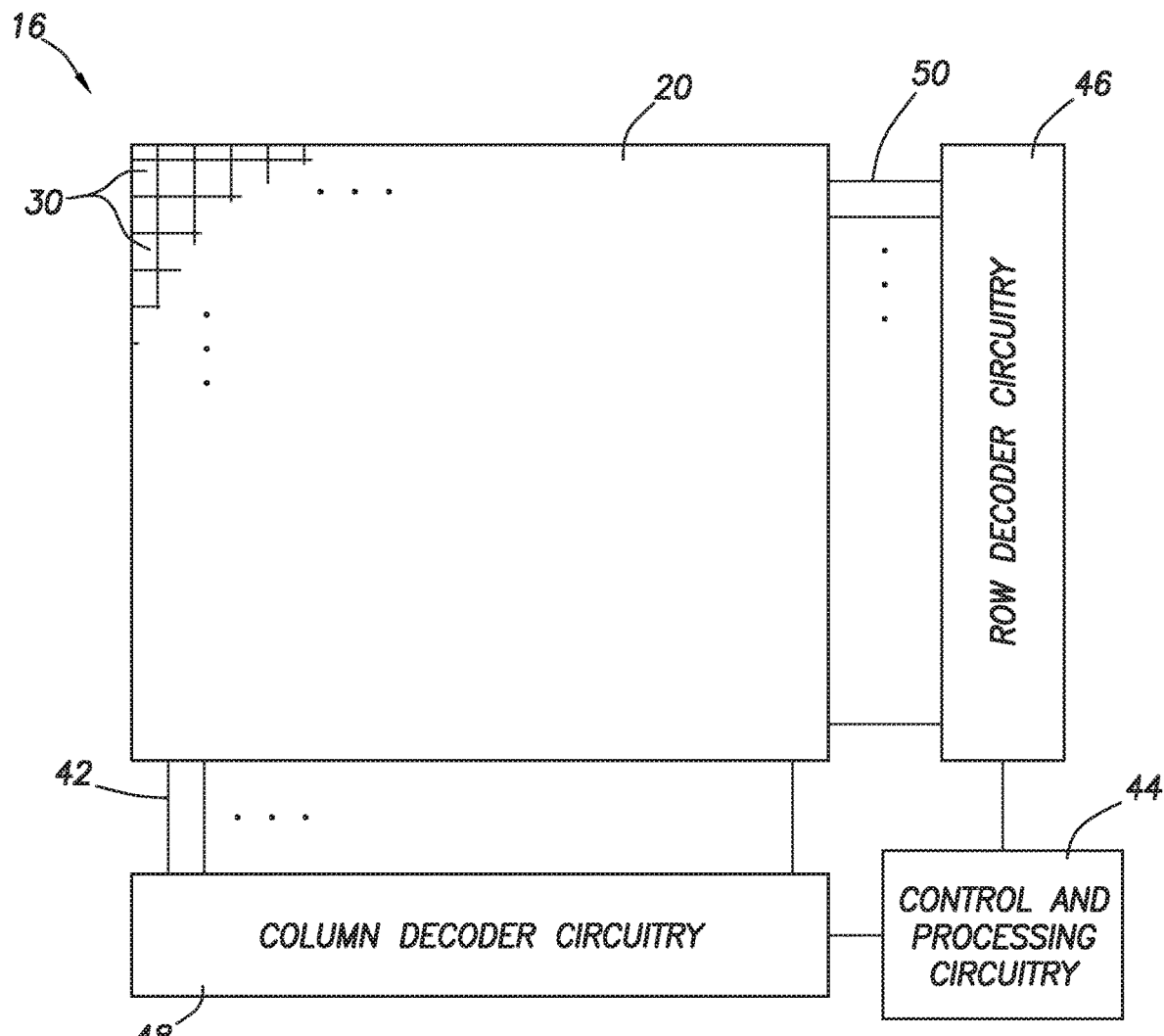
FIG. 2 is a diagram of an illustrative pixel array and associated readout circuitry for reading out image signals from the pixel array in accordance with an embodiment.

As shown in FIG. 2, image sensor 16 may include pixel array 20 containing image sensor pixels 30 (sometimes referred to herein as image pixels or pixels) arranged in rows and columns and control and processing circuitry 44 (which may include, for example, image signal processing circuitry). Pixel array 20 may contain, for example, hundreds or thousands of rows and columns of image sensor pixels 30. Control circuitry 44 may be coupled to row control circuitry 46 (sometimes referred to herein as row decoder circuitry or row circuitry) and column readout circuitry 48 (sometimes referred to herein as column control circuitry, readout circuitry, processing circuitry, or column decoder circuitry). Row control circuitry 46 may receive row addresses from control circuitry 44 and supply corresponding row control signals such as reset, row-select, charge transfer, anti-blooming, dual conversion gain, and readout control signals to pixels 30 over row control lines 50. One or more conductive lines such as column lines 42 may be coupled to each column of pixels 30 in pixel array 20. Column lines 42 may be used for reading out image signals from pixels 30 and for supplying bias signals (e.g., bias currents, bias voltages, bias voltage levels, etc.) to pixels 30. If desired, during pixel readout operations, a pixel row in array 20 may be selected using row control circuitry 46 and image signals generated by image pixels 30 in that pixel row can be read out along column lines 42.

Image readout circuitry 48 may receive image signals (e.g., analog pixel values generated by pixels 30) over column lines 42. Image readout circuitry 48 may include sample and hold circuitry for sampling and temporarily storing image signals read out from pixel array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in pixel array 20 for operating pixels 30 and for reading out image signals from pixels 30. ADC circuitry in readout circuitry 48 may convert analog pixel values received from array 20 into corresponding digital pixel values (sometimes referred to as digital image data or digital pixel data). Image readout circuitry 48 may supply digital pixel data to control and processing circuitry 44 and/or processor 18 (FIG. 1) for pixels 30 in one or more pixel columns.

Pixel array 20 may be provided with a color filter array having multiple color filter elements, which allows a single image sensor to sample light of different colors. As an example, image sensor pixels such as image pixels 30 in array 20 may be provided with a color filter array which allows a single image sensor to sample red, green, and blue (RGB) light using corresponding red, green, and blue sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 30. A microlens may be formed over an upper surface of the color filter array to focus incoming light onto the photosensitive region associated with that pixel 30. A microlens may be formed over an upper surface of the color filter array to focus incoming light onto the photosensitive region associated with that pixel 30.

Figure 3:
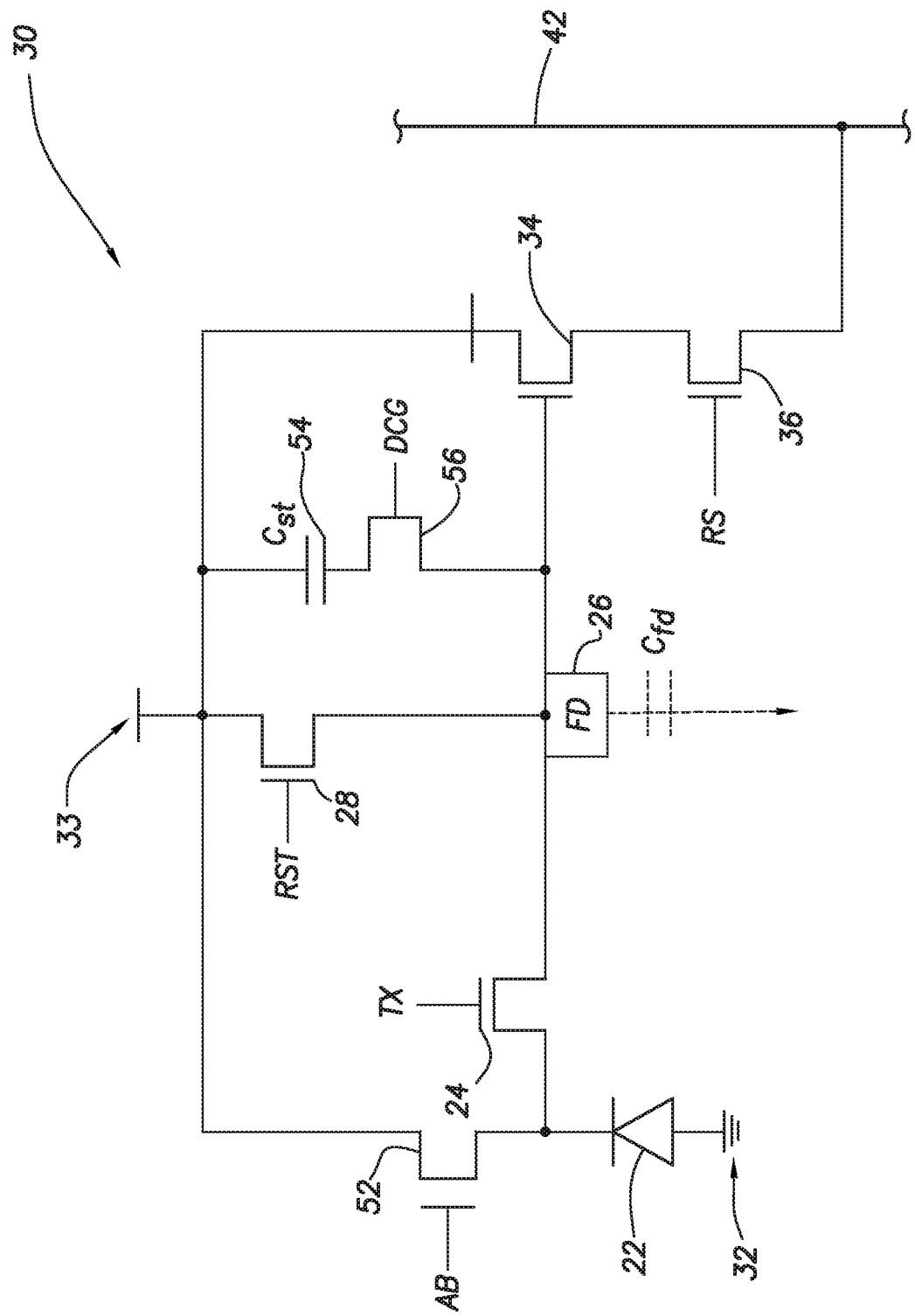
FIG. 3 is a diagram of an illustrative image sensor pixel in accordance with an embodiment.

Circuitry in an illustrative image pixel 30 of image sensor 16 is shown in FIG. 3. As shown in FIG. 3, pixel 30 may include a photosensitive element such as photodiode 22 (or photodetector 22). A positive pixel power supply voltage (e.g., voltage Vaa) may be supplied at positive power supply terminal 33. A ground power supply voltage (e.g., voltage Vss) may be supplied at ground terminal 32 (sometimes referred to herein as another power supply terminal). Incoming light may be gathered by photodiode 22 after the incoming light passes through a color filter structure. Photodiode 22 may convert the light to electrical charge.

Before an image is acquired, control signal AB may be asserted to turn on (anti-blooming) transistor 52 (e.g., asserted-high to activate the corresponding transistor) and reset photodiode 22 to a reset voltage (e.g., voltage Vaa). Reset control signal RST may also be asserted. This turns on reset transistor 28 and resets charge storage node 26 (also referred to as a floating diffusion or a floating diffusion region) to a reset voltage. Reset control signal RST may then be deasserted to turn off reset transistor 28 (e.g., asserted-low to deactivate the corresponding transistor). When control signal AB is deasserted to turn off transistor 52, signal acquisition may begin at photodiode 22. After an image acquisition process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) may exhibit a capacitance (e.g., capacitance Cfd) that is used to store the charge that has been transferred from photodiode 22. The signal associated with the stored charge on node 26 may be buffered by source-follower transistor 34. Row select transistor 36 may connect the source follower transistor 34 to column output line 42.

If desired, various types of image pixel circuitry may be used to implement the image pixels of image sensor 16. For example, each image sensor pixel 30 (see, e.g., FIG. 1) may be a three-transistor pixel, a pinned-photodiode pixel with four transistors, a global shutter pixel, etc. The circuitry of FIG. 3 is merely illustrative.

As an example, pixel 30 may also include overflow capacitor 54 (sometimes referred to herein as a charge storage structure) coupled to floating diffusion 26 via (overflow) transistor 56. In particular, pixel 30 may operate in an overflow mode of operation. In this mode of operation, pixel 30 may assert control signals TX and DCG (simultaneously) to activate transistors 24 and 56, respectively. Capacitor 54 may have a storage capacity that is much larger than that of floating diffusion 26. As such, capacitor 54 may be used extend the dynamic range of pixel 30 by storing large amounts of (overflow) charge (e.g., in bright image spots or scenes, during long integration periods, for charge integration). Pixel 30 may also operate in an LFM mode of operation, where control signals AB and TX (optionally in combination with control signal DCG) are asserted in an interweaved manner (e.g., alternatingly asserted) to acquire an image signal effectively during a short exposure period (e.g., multiple short integration periods within a long exposure period). In other words, to use control signals AB and TX/DCG in the interweaved manner, when control signal AB is asserted-high, control signals TX and DCG are asserted-low, and vice versa. Operating pixel 30 in an LFM mode allows pixel 30 to capture incident light that may otherwise evade capture due to flickering effects.

Figure 4:
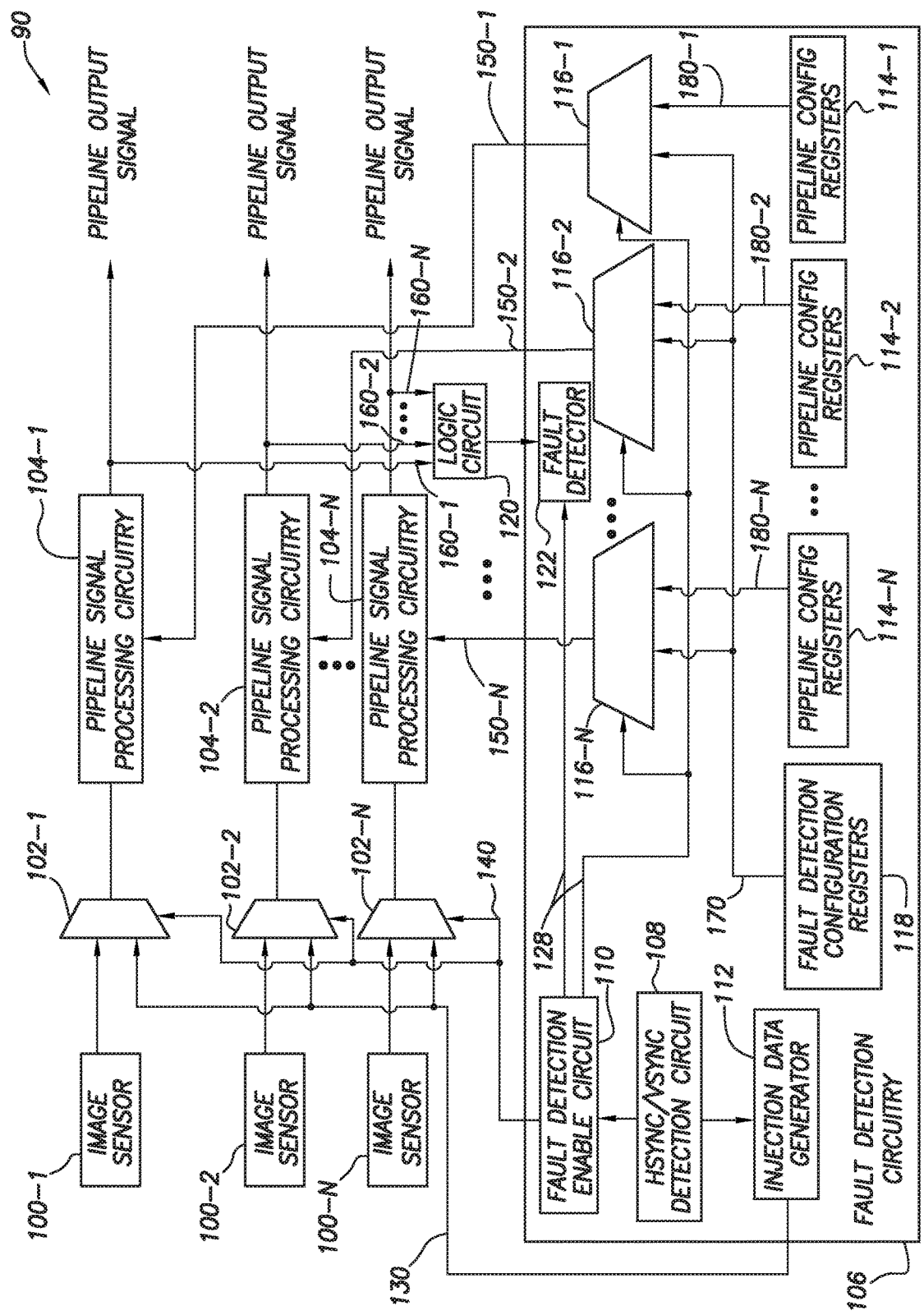
FIG. 4 is a diagram of an imaging system that includes pipeline processor fault detection circuitry in accordance with an embodiment.

In some scenarios, an imaging system (e.g., imaging system 10 in FIG. 1) may include multiple image sensors and corresponding processing circuitry. As shown in FIG. 4, imaging system 90 may include image sensors 100-1, 100-2, . . . 100-N coupled to corresponding processing circuitry 104-1, 104-2, . . . 104-N (sometimes referred to herein as pipeline signal processing circuitry, color pipe, pipeline processing circuitry, digital processing circuitry, digital processing circuits, and signal processing circuits). Image sensor 100-1 may be coupled to processing circuitry 104-1 via a corresponding selection circuit (e.g., multiplexer 102-1). In particular, image sensor 100-1 may generate image signals at image pixels, read out the generated image signals using readout circuitry, convert the generated image signals into digital data signals using readout circuitry (e.g., using analog-to-digital conversion circuitry in the readout circuitry). The digital data signals may be provided to a first input of multiplexer 102-1. This example is merely illustrative. Multiplexer 102-1 may receive a control signal that controls multiplexer 102-1 to pass the data signal from the first input to an output of multiplexer 102-1 and subsequently to processing circuitry 104-1 for further processing. Processing circuitry 104-1 may generate a pipeline output signal based on the input data signal.

Additional image sensors (e.g., image sensors 100-2, 100-3, . . . 100-N) may similarly provide corresponding image signals to a first input of respective multiplexers (e.g., multiplexers 102-2, 102-3, . . . , 102-N). Additional processing circuitry (e.g., processing circuitry 104-2, 104-3, . . . , 104-N) may selectively receive the corresponding image signals when the first input of each multiplexer is passed to the output of each multiplexer. As an example, the additional image sensors, multiplexers, and processing circuitry may have a similar configuration as described above in connection with image sensor 100-1, multiplexer 102-1, and processing circuitry 104-1. If desired, imaging system 90 may include any number of image sensors (one image sensor, two image sensors, three image sensors, more than three image sensors, etc.) and any number of pipeline processing circuitry (e.g., pipeline processing circuity for each image sensor, one or more pipeline processing circuitry shared between two or more image sensors, two or more pipeline processing circuitries coupled to a single image sensor, etc.). If desired, a separate selection circuit (e.g., multiplexer) may be coupled between each image sensor and processing circuitry pair.

As an example, one or more of image sensors 100-1, 100-2, . . . 100-N (collectively referred to herein as image sensors 100) may have a configuration of the type as described in FIG. 2 and an array of image pixels of the type as described in FIG. 3. If desired, one or more image sensors 100 may have different configuration from one another. As another example, one or more pipeline signal processing circuitry 104-1, 104-2, . . . , 104-N (collectively referred to herein as pipeline signal processing circuities 104) may have a configuration of the type shown in FIG. 1. In particular, one or more of pipeline processing circuitries 104 may formed on a share processor (e.g., processing circuitry 18 in FIG. 1). If desired, one or more of pipeline processing circuitries 104 may formed on separate processors.

As examples, each of pipeline processing circuitries 104 may include multiple separate functional processing circuits such as filtering circuits (e.g., a Bayer filter), noise reduction circuits, image scaling circuits, gamma correction circuits, image enhancement circuits, color space conversion circuits (e.g., between RGB YUV or YCbCr formats), data mapping circuits, chroma-subsampling circuits, framerate conversion circuits, (data) compression circuits, error correction circuits, demosiacing circuits, arithmetic circuits, binning circuits, etc. If desired, one or more pipeline signal processing circuitries 104 may include any other types of circuits such as analog processing circuitry, analog to digital conversion circuitry, etc.

In some configurations, each pair of a given image sensor 100 and a given pipeline processing circuitry 104 may form a separate imaging device analogous to imaging system 10. If desired, each pair may be formed on a separate module or from separate hardware. The pairs of image sensor and pipeline processing circuitry may operate in combination for some applications as an example.

In one or more applications, the integrity of processing circuitry (e.g., the hardware and software integrity, that processing circuitry accurately perform the intended processing) may be critical. To ensure the integrity of the processing circuitry, an imaging system may include fault detection circuitry. It may be especially desirable to provide an efficient and cost-effective system to ensure the integrity of the processing circuitry without providing separate and costly redundant circuitry. As an example, referring to FIG. 4, imaging system 90 may include fault detection circuitry 106 (sometimes referred to herein as error detection circuitry or fault detection circuit) may be coupled to each of processing circuitries 104. Fault detection circuitry 106 may provide processing circuitry with fault detection capabilities to imaging system 90 (e.g., to provide fault checking or detection for processing circuitries 104).

In particular, fault detection circuitry 106 may include injection data generator 112. Injection data generator 112 may generate test data or injection data to be injected into pipeline signal processing circuitries 104. More specifically, test data may be provided via path 130 to a second input of each multiplexer coupled to each of processing circuitry 104-1, 104-2, . . . , 104-N. Fault detection circuitry 106 may include fault detection enable circuit 110 that provides control signals (via paths 140) to respective control inputs of multiplexers 102-1, 102-2, . . . 102-N (collectively referred to herein as multiplexers 102).

During an image signal processing mode of operation, one or more of multiplexers 102 may receive a control signal that selects a first input of the one or more multiplexers 102 (e.g., an input that receives image signals from image sensors 100). During a fault detection mode of operation, one or more multiplexers 102 may receive a control signal that selects a second input of the one or more multiplexers 102 (e.g., an input that receives test signals from fault detection circuitry 106). In other words, during the fault detection mode of operation, fault detection enable circuit 110 may control the one or more multiplexers 102 to pass test signals from the corresponding second inputs of the one or more multiplexers 102 to respective processing circuitries 104.

As an example, fault detection circuitry 106 may perform fault detection operations during a horizontal blank period and/or a vertical blank period. These blank periods may be calculated based on corresponding horizon synchronization (hsync) and/or vertical synchronization (vsync) signals. Fault detection circuitry 106 may include hsync and/or vsync detection circuit 108 (sometimes referred to herein as blank period detection circuit 108, detection circuit 108, or timing synchronization circuit 108). In particular, detection circuit 108 may calculate a time and a duration of simultaneous horizontal and vertical blank periods. During these blank periods, image data is not being provided by image sensors 100 and/or is not being received by pipeline signal processing circuitries 104. As such, fault detection operations may be performed on processing circuitries 104 without interrupting image signal processing operations normally performed by processing circuitries 104. In other words, detection circuit 108 may provide enable or control signals to fault detection enable circuit 110 and injection data generator 112 to initialize fault detection operations at a synchronization of a given horizontal and vertical blank period (e.g., a period during which both horizontal and vertical blanking occurs, a period after processing an entire image frame) and to terminate fault detection operations and resume image signal processing operations at an end of the given blank period.

Signal processing circuitries 104 may each include a configuration space (which may be implemented in configuration storage circuitry or configuration memory) that implement one or more functions based on the state of the configuration space. The example of configuration registers within signal processing circuitries 104 that define the configuration space is described herein as an example. If desired, any type of configuration space implementation may be used. As an example, during image signal processing operations, the configuration registers of each of signal processing circuitries 104 may have a first set of states. As another example, during fault detection operations, the configuration register of each of signal processing circuitries 104 may have a second set of states that is different from the first set of states. If desired, one or more configuration register may have same states during both the image signal processing operations and the fault detection operations.

To switch between the first and second sets of states, fault detection circuitry 106 may include multiplexers 116-1, 116-2, . . . 116-N (collectively referred to herein as multiplexers 116). The respective output of each of multiplexers 116 may provide a set of states for configuration registers in a corresponding signal processing circuitry (e.g., a given one of signal processing circuitries 104). As examples, an output of multiplexer 116-1 may provide control signals or signals indicative of configuration register states to processing circuitry 104-1 via path 150-1. Similarly, multiplexers 116-2, 116-3, . . . , 116-N may provide signals to processing circuitries 104-2, 104-3, . . . , 104-N via respective paths 150-2, 150-3, . . . , 150-N.

Each of multiplexers 116 may include first and second inputs. A first input of each multiplexer in multiplexers 116 may be coupled to a corresponding one of fault pipeline configuration registers (e.g., pipeline configuration registers 114-1, 114-2, . . . , 114-N, collectively referred to herein as pipeline configuration registers 114) via paths 180-1, 180-2, . . . , 180-N. Pipeline configuration registers 114 may store registers states for configuration registers in corresponding processing circuitries 104 during image signal processing operations. A second input of each multiplexer in multiplexers 116 may be coupled to fault detection configuration registers 118 (via path 170).

Fault detection enable circuit 110 may provide control signals to multiplexers 116 at respective control inputs of multiplexers 116 via paths 128. In particular, the control signal may control one or more multiplexers 116 to pass pipeline configuration register states to processing circuitries 104 when starting fault detection operations (e.g., when image signal processing operations is paused during a blanking period). The control signal may control one or more multiplexers 116 to pass fault detection configuration register states to processing circuitries 104 when starting image signal processing operations (e.g., when fault detection operations is finished at an end of the blanking period).

As an example, fault detection enable circuit 110 may control multiplexers 102 to pass the same test signals to each of processing circuitries 104 by asserting a control signal provided to multiplexers 102 via paths 140. Fault detection enable circuit 110 may control multiplexers 116 to pass the same fault detection configuration register states to each of processing circuitries 104. Fault detection enable circuit 110 may also send a control signal over path 128 to enable or activate fault detector 122, which receives output test data from each of processing circuitries 104 via logic circuits 120 (e.g., through paths 160-1, 160-2, . . . , 160-N). Logic circuit 120 may include any type of logic circuitry such as logic gates, comparison circuits, arithmetic circuits, etc. Logic circuit 120 may determine if the output test data each of processing circuitries 104 are the same. While logic circuit 120 is show as being outside of fault detection circuitry 106, logic circuit 120 may be implement from portions of fault detection circuitry 106 (e.g., may be formed from a portion of fault detector 122).

In the scenario in which each of processing circuitries 104 are configured with the same configuration states and receive the same input test data, a fault with one or more of processing circuitries 104 may be detected if the output test data for each processing circuitries 104 does not match with one another (e.g., is not the same as one another). In other words, each of the processing circuitries 104 serves as a redundant processing circuitry to one another. The fault detector may be configured to provide a fault signal to additional processing circuitry in imaging system 90 in response to determining an error with one or more of processing circuitries 104. The additional processing circuitry may perform further actions such as bypassing one or more faulty pipeline signal processing circuitries, resetting or updating the one or more faulty pipeline processing circuitries, executing BIST (i.e., built-in self-test) diagnostics, performing further fault detection operations, etc. This scenario of operations is merely illustrative. If desired, fault detection circuitry may use other implementations to detect possible faults within one or more pipeline signal processing circuitry.

By using fault detection circuitry coupled to multiple pipeline signal processing circuitries, an imaging system can efficiently detect fault within the pipeline signal processing circuitries. In other words, the inclusion of fault detection circuitry leverages existing hardware (e.g., pipeline processing circuitry) to efficiently perform fault detection. As fault detection configuration registers may be used to implement any set of configurations for each of processing circuitries 104, each section or block, or each set of sections or blocks may be tested. If desired, fault detection configuration registers may test one or more blocks in a sequential manner across multiple blanking periods. Therefore, every portion of each processing circuitry 104 may be tested for faults or errors thereby enabling 100% fault coverage. If desired, only a subset of processing circuitries 104 may be tested at a time.

Figure 5:
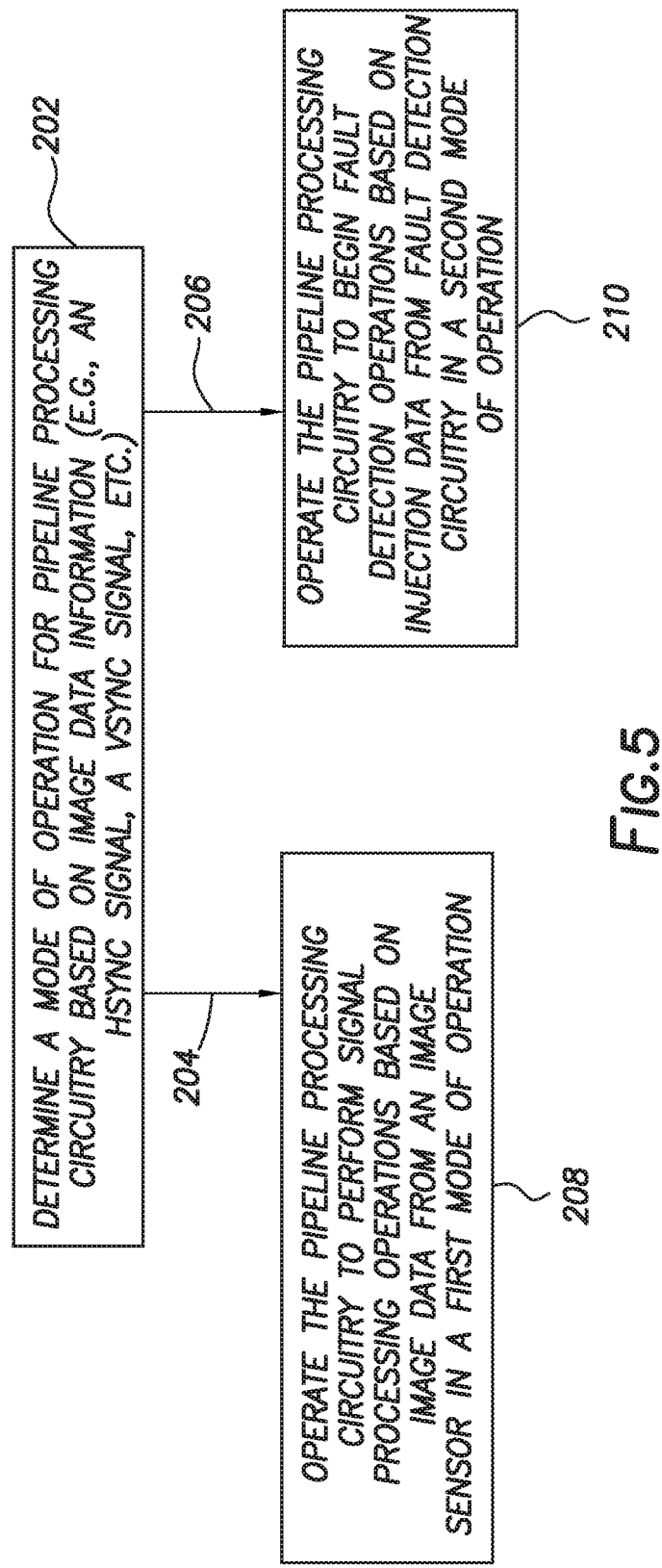
FIG. 5 is a flowchart for operating an imaging system having one or more pipeline processors using multiple modes of operation in accordance with an embodiment.

FIG. 5 shows a flowchart for operating an imaging system such as imaging system 90 having fault detection circuitry 106 in FIG. 4 in two modes of operations. At step 202, fault detection circuitry (e.g., fault detection circuitry 106 in FIG. 4) may determine a mode of operation for pipeline processing circuitry (e.g., one or more processing circuitries 104) based on image data information (e.g., image data metadata, a horizontal sync "hsync" signal indicative of a horizontal line of image data provided from an image sensor, a vertical sync "vsync" signal indicative of a frame of image data provided from an image sensor, etc.). Processing may proceed via one of paths 204 or 206.

During signal processing operations, image sensors may send image data to processing circuitry in portions leading to a signal processing pausing period after each line (e.g., data from a pixel row) and/or after each frame (e.g., data from a pixel array). Processing may proceed via path 204 to step 208 to perform signal processing. In other words, at step 208, the fault detection circuitry may operate the pipeline processing circuity to perform signal processing operations based on image data from an image sensor in a first mode of operation.

During each signal processing pausing period, processing may proceed via path 206 to step 210 to perform fault detection. In other words, at step 210, the fault detection circuitry may operate the pipeline processing circuitry to begin fault detection operations based on injection data (e.g., test data) from the fault detection circuitry (e.g., injection data generator 112 in FIG. 4).

After processing one of steps 208 or 210, fault detection circuitry (e.g., hsync and vsync detection circuit 108 in FIG. 4) may determine whether a different operating mode should be selected. In other words, after processing one of steps 208 or 210, processing may return to step 202. The steps in FIG. 5 are merely illustrative. If desired, an imaging system having fault detection circuitry may operate any additional modes. If desired, an imaging system having fault detection circuitry may operate exclusively in a fault detection mode.

Figure 6:
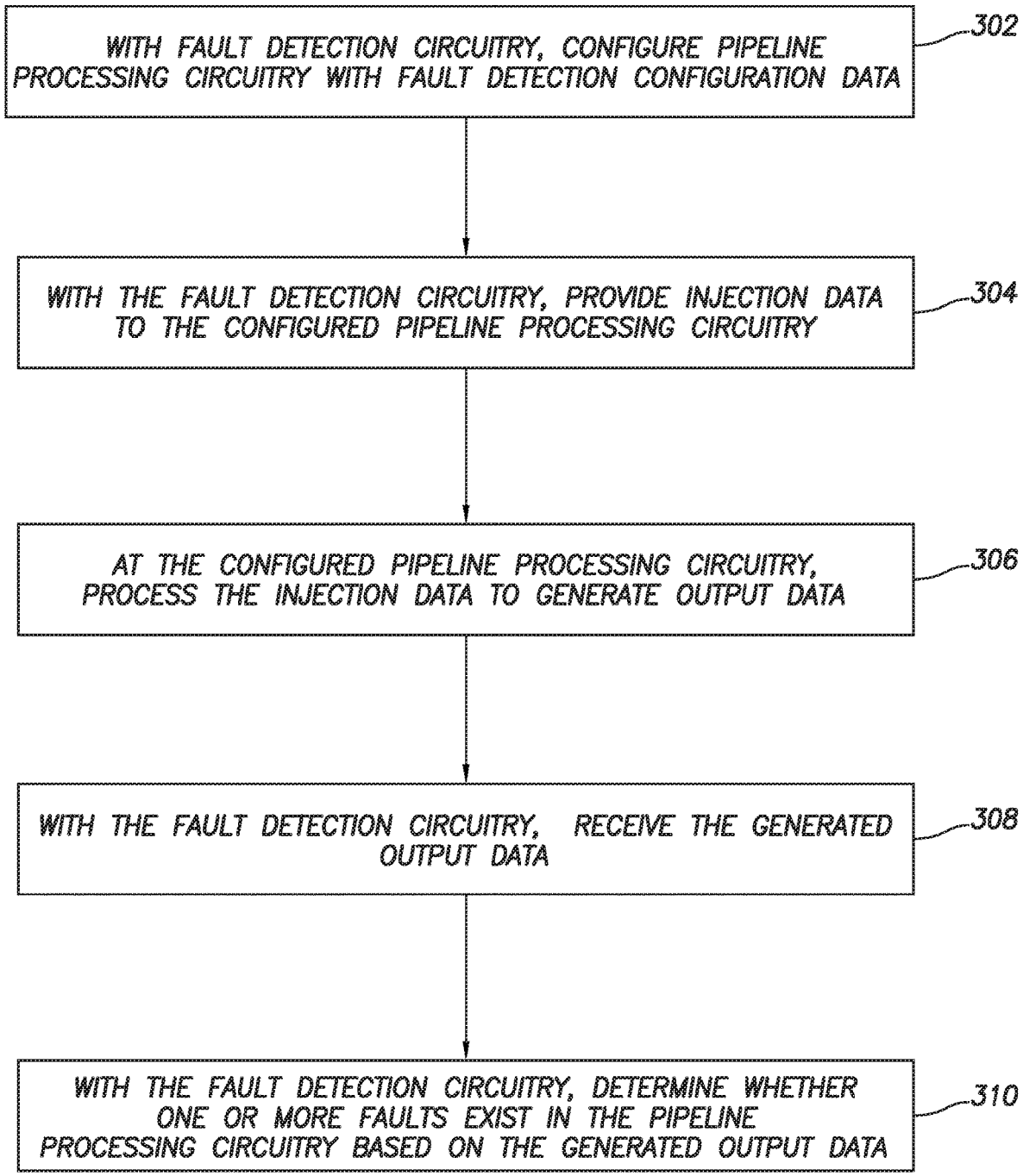
FIG. 6 is a flowchart for operating an imaging system having pipeline processor fault detection circuitry to perform fault detection operations with one or more pipeline processors in accordance with an embodiment.

FIG. 6 shows a flowchart for operating an imaging system such as imaging system 90 in a fault detection mode of operation (e.g., as during step 210 in FIG. 5). In particular, at step 302, fault detection circuitry (e.g., fault detection circuitry 106 in FIG. 4) may configure pipeline processing circuitry (e.g., one or more of processing circuitries 104) with fault detection configuration data. As an example, fault detection configuration data may be stored in memory or storage circuitry on the fault detection circuitry (e.g., in registers, in fault detection configuration registers 118 in FIG. 4, etc.). The fault detection configuration data may be selectively passed (via a selection circuit) to the pipeline processing circuitry.

Fault detection configuration data may configure the pipeline processing circuitry to activate suitable portions (e.g., portions to be tested for faults) of the pipeline processing circuitry. As examples, fault detection configuration data may deactivate a first functional block of pipeline processing circuitry while activating a second functional block of pipeline processing circuitry to be tested, may deactivate a first portion of pipeline processing circuitry while activating the remaining portion of pipeline processing circuitry, may active all functional blocks of pipeline processing circuitry, etc. The fault detection configuration data may be provided to the pipeline processing circuitry via one or more paths (e.g., paths 150) coupled to memory circuitry, storage circuitry, configuration registers in the fault detection circuitry. If desired, the fault detection configuration data may include control signals that enable or disable portions of the pipeline processing circuitry.

At step 304, the fault detection circuitry may provide injection data to the (configured) pipeline processing circuitry. In some scenarios, when no fault detection configuration is required at the pipeline processing circuitry, step 302 may be omitted and injection data may be provided to pipeline process circuitry that are not specifically configured. The fault detection circuitry may include an injection data generator (e.g., injection data generation 112 in FIG. 4) that generates the injection data. The injection data may be selectively passed (via a selection circuitry) to the pipeline processing circuitry.

At step 306, the (configured) pipeline processing circuitry may process the injection data (e.g., input test data) to generate the output data (e.g. output test data).

At step 308, the fault detection circuitry may receive the generated output data from the pipeline processing circuitry. In some scenarios, the fault detection circuitry may receive one or more signals generated based on the output data from the pipeline processing circuitry. As an example, the fault detection circuitry (e.g., at fault detector 122) may receive a signal indicative of the output data.

At step 310, the fault detection circuitry may determine whether one or more faults exist in the pipeline processing circuitry based on the generated output data. As an example, the generated output data may be compared with other output data generated by additional pipeline processing circuitries. As another example, the generated output data may be compared with a known output value (e.g., an expected test output value based on the current configuration of the pipeline processing circuitry and the test input).

While steps 302-310 refer to pipeline processing circuitry, these steps may be applied to one or more pipeline processing circuitries 104. As examples, these steps may be applied to one or more pipeline processing circuitries 104 in parallel (of if desired sequentially). Steps 302-310 are merely illustrative. If desired, one or more steps may be omitted (e.g., steps 302 may be omitted). If desired, the order of these steps may be changed. If desired, one or more additional steps may be added. As an example, one or more steps 302-310 in FIG. 6 may be processed as a part of step 210 in FIG. 5.

Figure 7:
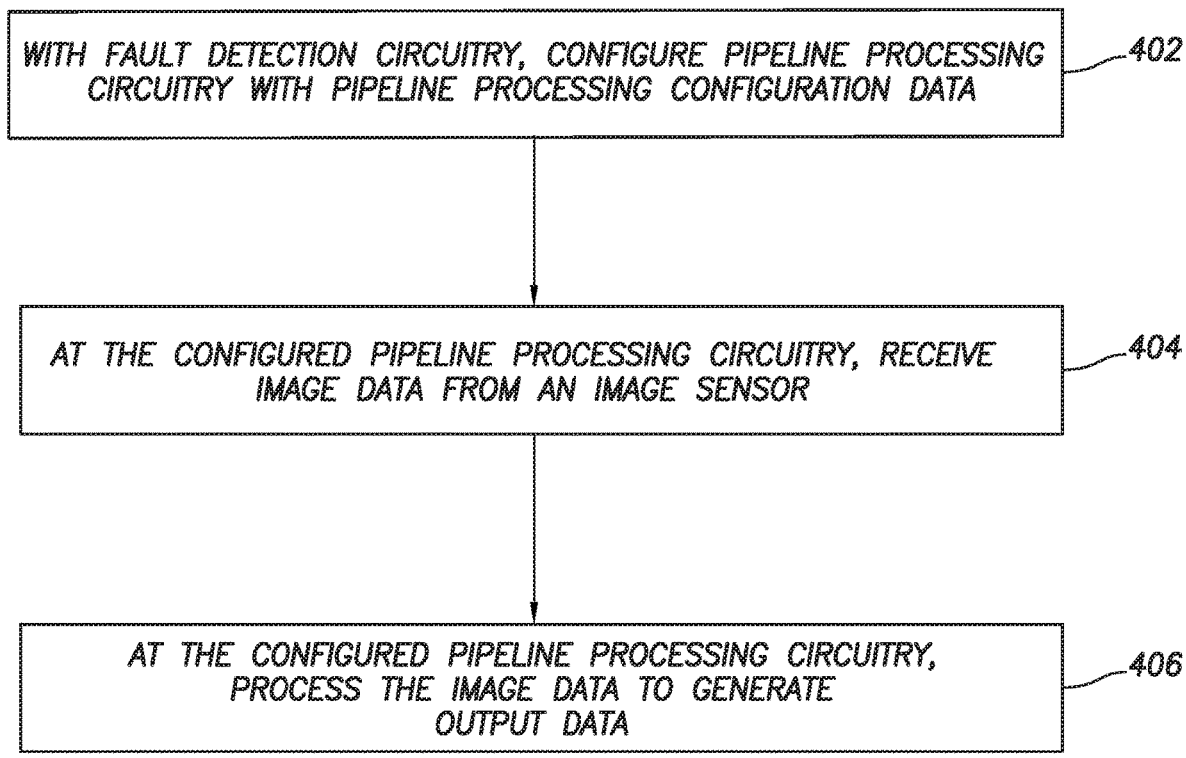
FIG. 7 is a flow chart for operating an imaging system having pipeline processor fault detection circuitry to perform image sensor data processing operations with one or more pipeline processors in accordance with an embodiment.

FIG. 7 shows a flowchart for operating an imaging system such as imaging system 90 in an image processing mode of operation (e.g., as during step 208 in FIG. 5). In particular, at step 402, fault detection circuitry (e.g., fault detection circuitry 106 in FIG. 4) may configure pipeline processing circuitry (e.g., one or more pipeline processing circuitries 104 in FIG. 4) with pipeline processing configuration data. As an example, the pipeline processing configuration data may be stored in memory or storage circuitry on the fault detection circuitry (e.g., in registers, in corresponding fault detection configuration registers 114 in FIG. 4, etc.). The pipeline processing configuration data may be selectively passed (via a selection circuit) to the pipeline processing circuitry.

Pipeline processing configuration data may configure the pipeline processing circuitry to activate suitable portions (e.g., portions to process actual image signals to generate processed image data) of the pipeline processing circuitry. As examples, pipeline processing configuration data may deactivate a first functional block of pipeline processing circuitry while activating a second functional block of pipeline processing circuitry to be tested, may deactivate a first portion of pipeline processing circuitry while activating the remaining portion of pipeline processing circuitry, may active all functional blocks of pipeline processing circuitry, etc. The pipeline processing configuration data may be provided to the pipeline processing circuitry via one or more paths (e.g., paths 150) coupled to memory circuitry, storage circuitry, configuration registers in the fault detection circuitry. If desired, the pipeline processing configuration data may include control signals that enable or disable portions of the pipeline processing circuitry.

At step 404, the (configured) pipeline processing circuitry may receive image data from an image sensor (e.g., one or more of corresponding image sensors 100). In some scenarios, when no new configuration is required at the pipeline processing circuitry, step 402 may be omitted and image data may be provided to pipeline process circuitry that are not specifically configured.

At step 406, the (configured) pipeline processing circuitry may process the image data to generate pipeline output data (sometimes referred to herein as processed image data).

While steps 402-406 refer to pipeline processing circuitry, these steps may be applied to one or more pipeline processing circuitries 104. As examples, these steps may be applied to one or more pipeline processing circuitries 104 in parallel (of if desired sequentially). Steps 402-406 are merely illustrative. If desired, one or more steps may be omitted (e.g., steps 402-406 may be omitted). If desired, the order of these steps may be changed. If desired, one or more additional steps may be added. As an example, one or more steps 402-406 in FIG. 7 may be processed as a part of step 208 in FIG. 5.

In some scenarios, an imaging system (e.g., imaging system 90) may include at least two functionally identical pipeline processing circuitries (e.g., processing circuitries 104) in an image signal processor. The two pipeline processing circuitries may be configured (e.g., fault detection circuitry) to provide the capability of processing image data streams from a plurality of image sensors (e.g., two or more image sensors) in parallel and to provide 100% logic fault coverage for the two pipeline processing circuitries.

Additionally, the imaging system may include a pipeline processor fault detection circuitry (e.g., fault detection circuitry 106) that includes a functionality to dynamically execute fault or error detection operations using the two pipeline processing circuitries (which at as redundant pipeline processing circuitries) between processing frames and/or lines of image data in image signal processing operations. The fault detection circuitry may include logic for maintaining or storing pipeline processing configuration register states in a configuration space and fault detection configuration register states in another configuration space. During image processing operations, the pipeline processing circuitries may be configured with the pipeline processing configuration register states. When fault detection circuitry enables fault detection, the pipeline processing circuitries may be dynamically configured with the fault detection configuration register states. Once fault detection is completed, the pipeline processing configuration register states may be reinstated for the pipeline processing circuitries. Fault detection and test data injection may occur based on a horizontal and/or vertical sync circuit (e.g., circuit 108). Based on the configuration of the pipeline processing circuitries, the horizontal and/or vertical sync circuit may calculate a time and a duration of simultaneous horizontal and vertical blank times to initiate and terminate fault detection. In such a way, fault detection is executed opportunistically when image data is not being received from the image sensors at the pipeline processing circuitries.

Various embodiments have been described illustrating systems with and methods for fault detection.

In various embodiments, an imaging system may include an image sensor configured to generate image data, signal processing circuitry coupled to the image sensor, a selection circuit configured to receive the image data at a first input of the selection circuit, and fault detection circuitry configured to generate test data. The selection circuit may be configured to receive the test data at a second input of the selection circuit. The signal processing circuitry may be configured to receive the image data in a first mode of operation and may be configured to receive the test data in a second mode of operation. The fault detection circuitry may be configured to store a first set of configuration states for the signal processing circuitry and may be configured to provide the first set of configuration states to the signal processing circuitry during the first mode of operation. The fault detection circuitry may be configured to store a second set of configuration states for the signal processing circuitry and may be configured to provide the second set of configuration states to the signal processing circuitry during the second mode of operation. The fault detection circuitry may include an additional selection circuit configured to receive the first set of configuration states at a first input of the additional selection circuit and configured to receive the second set of configuration states at a second input of the additional selection circuit. The fault detection circuitry may include a detection enable circuit configured to provide a first control signal to the selection circuit, a second control signal to the additional selection circuit, and a third control signal to a fault detector coupled to an output of the signal processing circuitry.

The fault detection circuitry may be configured to dynamically enable fault detection between time periods during which the signal processing circuitry is configured to receive the image data. The selection circuit may be configured to receive the image data in at least first and second portions during respective first and second time periods. The fault detection circuitry may include a timing synchronization circuit configured to determine a pausing period between the first and second time periods. The second mode of operation may occur during the pausing period and the first mode of operation occur during the first and second time periods. The signal processing circuitry may be configured to process the test data and generate output test data. The fault detection circuitry is configured to receive the output test data and is configured to determine one or more possible faults in the signal processing circuitry based on the output test data.

The imaging system may include first and second image sensors, and first and second signal processing circuits. The first image sensor may be coupled to the first signal processing circuit and the second image sensor may be coupled to the second signal processing circuit. The imaging system may include error detection circuitry coupled to the first and second signal processing circuits. The error detection circuitry may be configured to provide fault detection configuration data to the first and second signal processing circuits. The error detection circuitry may include an injection data generator configured to generate injection data. The first and second signal processing circuits may be configured to receive the generated injection data. The error detection circuitry may configure the first and second signal processing circuits using the fault detection configuration data. The first processing circuit may be configured to process the injection data to generate a first output signal. The second processing circuit may be configured to process the injection data to generate a second output signal. The error detection circuitry may include a fault detector configured to determine whether a fault exists in at least one of the first and second signal processing circuits. The first and second image sensors may generate first and second sets of image data, respectively. The first signal processing circuit may be configured to process the first set of image data. The second signal processing circuit may be configured to process the second set of image data. The first and second signal processing circuits may be configured to respectively process the first and second sets of image data during an image signal processing mode of operation. The first and second signal processing circuits may be configured to process the injection data during a fault detection mode of operation. The first and second signal processing circuits may have the same functions, and fault detection configuration data provided to the first signal processing circuit may be the same as fault detection configuration data provided to the second signal processing circuit.

The fault detection circuit may be configured to detect a fault in a signal processor that process a plurality of image frames. The fault detection circuit may include image processing configuration registers configured to store processing circuitry configuration data for an image processing mode of operation, fault detection configuration registers configured to store fault detection configuration data for a fault detection mode of operation, and a detection circuit configured to switch between the image processing mode of operation and the fault detection mode of operation based information for the plurality of image frames. The fault detection circuit may further include a test data generator coupled to the detection circuit and configured to receive a control signal from the detection circuit and generate test data for the fault detection mode of operation based on the control signal. The fault detection circuit may further include a fault detector and an enable circuit coupled to the detection circuit and configured to receive an additional control signal from the detection circuit and activate the fault detector based on the control signal. The fault detection circuit may further include an input coupled to the fault detector and configured to provide a signal indicative of the fault in the signal processor and an output. The enable circuit may be configured to selectively coupled one of the image processing configuration registers or one of fault detection configuration registers to the output.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system, comprising:
   an image sensor configured to generate image data;
   signal processing circuitry coupled to the image sensor;
   fault detection circuitry configured to generate test data, the fault detection circuitry having a timing synchronization circuit configured to identify a signal processing pausing period between first and second time periods; and
   a selection circuit configured to receive the image data at a first input of the selection circuit and configured to receive the test data at a second input of the selection circuit, wherein the selection circuitry is configured to pass the image data to the signal processing circuitry during the first and second time periods and is configured to pass the test data to the signal processing circuitry during the signal processing pausing period.

2. The imaging system defined in claim 1, wherein the fault detection circuitry is configured to store a first set of configuration states for the signal processing circuitry and is configured to provide the first set of configuration states to the signal processing circuitry for a first mode of operation that occurs during the signal processing pausing period.

3. The imaging system defined in claim 2, wherein the fault detection circuitry is configured to store a second set of configuration states for the signal processing circuitry and is configured to provide the second set of configuration states to the signal processing circuitry for a second mode of operation that occurs during the first and second time periods.

4. The imaging system defined in claim 3, wherein the fault detection circuitry includes an additional selection circuit configured to receive the first set of configuration states at a first input of the additional selection circuit and configured to receive the second set of configuration states at a second input of the additional selection circuit.

5. The imaging system defined in claim 4, wherein the fault detection circuitry includes a detection enable circuit configured to provide a first control signal to the selection circuit, a second control signal to the additional selection circuit, and a third control signal to a fault detector coupled to an output of the signal processing circuitry.

6. The imaging system defined in claim 1, wherein the fault detection circuitry is configured to dynamically enable fault detection outside of time periods during which the signal processing circuitry processes the image data.

7. The imaging system defined in claim 1, wherein the selection circuit is configured to pass a first portion of the image data to the signal processing circuitry during the first time period and is configured to pass a second portion of the image data to the signal processing circuitry during the second time period.

8. The imaging system defined in claim 7, wherein the signal processing circuitry operates in a first mode of operation during the signal processing pausing period and operates in a second mode of operation during the first and second time periods.

9. The imaging system defined in claim 8, wherein the signal processing circuitry is configured to process the test data and generate output test data and wherein the fault detection circuitry is configured to receive the output test data and is configured to determine one or more faults in the signal processing circuitry based on the output test data.

10. An imaging system, comprising:
    first and second image sensors;
    first and second signal processing circuits, wherein the first image sensor is coupled to the first signal processing circuit and the second image sensor is coupled to the second signal processing circuit; and
    error detection circuitry that is coupled to the first and second signal processing circuits and that is configured to provide fault detection configuration data to the first and second signal processing circuits, the error detection circuitry comprising a fault detector configured to compare first output test data from the first signal processing circuit with second output test data from the second signal processing circuit to determine whether a fault exists in at least one of the first or second signal processing circuits.

11. The imaging system defined in claim 10, wherein the error detection circuitry includes an injection data generator configured to generate injection data and wherein the first and second signal processing circuits are configured to receive the generated injection data.

12. The imaging system defined in claim 11, wherein the error detection circuitry configures the first and second signal processing circuits using the fault detection configuration data, wherein the first processing circuit is configured to process the injection data to generate the first output test data, and wherein the second processing circuit is configured to process the injection data to generate the second output test data.

13. The imaging system defined in claim 12, wherein the first and second image sensors are configured to generate first and second sets of image data, respectively, wherein the first signal processing circuit is configured to process the first set of image data, and wherein the second signal processing circuit is configured to process the second set of image data.

14. The imaging system defined in claim 13, wherein the first and second signal processing circuits are configured to respectively process the first and second sets of image data during an image signal processing mode of operation and wherein the first and second signal processing circuits are configured to process the injection data during a fault detection mode of operation.

15. The imaging system defined in claim 10, wherein the first and second signal processing circuits have the same functions, and the fault detection configuration data provided to the first signal processing circuit is the same as the fault detection configuration data provided to the second signal processing circuit.

16. A fault detection circuit configured to detect a fault in a signal processor that processes a plurality of image frames, the fault detection circuit comprising:
    image processing configuration registers configured to store processing circuitry configuration data and configured to provide the processing circuitry configuration data to the signal processor for an image processing mode of operation;

fault detection configuration registers configured to store fault detection configuration data and configured to provide the fault detection configuration data to the signal processor for a fault detection mode of operation; and a detection circuit configured to switch between the image processing mode of operation and the fault detection mode of operation based on information for the plurality of image frames.

17. The fault detection circuit defined in claim 16, further comprising:

a test data generator coupled to the detection circuit and configured to receive a control signal from the detection circuit and generate test data for the fault detection mode of operation based on the control signal.

18. The fault detection circuit defined in claim 17, further comprising:

a fault detector; and an enable circuit coupled to the detection circuit and configured to receive an additional control signal from the detection circuit and activate the fault detector based on the additional control signal.

19. The fault detection circuit defined in claim 18, further comprising:

an input coupled to the fault detector and configured to provide a signal indicative of any fault in the signal processor; and an output, wherein the enable circuit is configured to selectively couple one of the image processing configuration registers or one of the fault detection configuration registers to the output.

* * * * *